(12) United States Patent
Wang et al.

(10) Patent No.: US 11,657,643 B1
(45) Date of Patent: May 23, 2023

(54) FINGERPRINT SENSING DEVICE

(71) Applicant: Novatek Microelectronics Corp., Hsinchu (TW)

(72) Inventors: Shu-Fang Wang, Hsinchu (TW); Dong-Hai Huang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/701,690

(22) Filed: Mar. 23, 2022

Related U.S. Application Data

(60) Provisional application No. 63/300,054, filed on Jan. 17, 2022.

(51) Int. Cl.
*G06V 40/13* (2022.01)
*G06F 3/041* (2006.01)
*G06F 3/042* (2006.01)
*G06F 21/32* (2013.01)

(52) U.S. Cl.
CPC ......... *G06V 40/1318* (2022.01); *G06F 3/042* (2013.01); *G06F 3/0412* (2013.01); *G06F 21/32* (2013.01)

(58) Field of Classification Search
None
See application file for complete search history.

(56) References Cited

U.S. PATENT DOCUMENTS

2016/0006969 A1* 1/2016 Matsumoto ....... H01L 27/14621
348/308
2021/0333928 A1* 10/2021 Wu ..................... G06V 40/1365

\* cited by examiner

*Primary Examiner* — Joseph R Haley
(74) *Attorney, Agent, or Firm* — JCIPRNET

(57) ABSTRACT

A fingerprint sensing device including a plurality of pixel blocks is provided. The pixel blocks are arranged in an array. Each of the pixel blocks includes a conversion gain. At least two of the conversion gains are different, and the pixel block located in a central location of the array has a minimum conversion gain.

19 Claims, 6 Drawing Sheets

FINGERPRINT SENSING DEVICE

CROSS-REFERENCE TO RELATED APPLICATION

This application claims the priority benefit of U.S. Provisional application Ser. No. 63/300,054, filed on Jan. 17, 2022. The entirety of the above-mentioned patent application is hereby incorporated by reference herein and made a part of this specification.

BACKGROUND

Technical Field

The invention relates to an image sensing device, more specifically, to a fingerprint sensing device.

Description of Related Art

Fingerprint sensors are widely applied in a variety of electronic devices such as mobile phone, laptop and personal digital assistant (PDA) for fingerprint recognition. During the fingerprint recognition using an optical fingerprint sensor, a fingerprint image that is captured under appropriate exposure time is critical for the accuracy of the fingerprint recognition. To enhance the fingerprint image quality, illuminance of light or exposure time may be increased in related arts. However, by increasing illuminance of light or exposure time, fingerprint feature of the fingerprint image may be blurred due to overexposure, so as to affect the accuracy of the fingerprint recognition.

Nothing herein should be construed as an admission of knowledge in the prior art of any portion of the present disclosure.

SUMMARY

The invention is directed to a fingerprint sensing device, capable of enhancing the fingerprint image quality and maintaining the accuracy of the fingerprint recognition.

The invention provides a fingerprint sensing device including a plurality of pixel blocks. The pixel blocks are arranged in an array. Each of the pixel blocks includes a conversion gain. At least two of the conversion gains are different, and the pixel block located in a central location of the array has a minimum conversion gain.

In an embodiment of the invention, the pixel blocks include a plurality of first pixel blocks and a plurality of second pixel blocks. The first pixel blocks forms a sub-array included in the array. Each of the first pixel blocks comprising a first conversion gain. The second pixel blocks are located around the sub-array. Each of the second pixel blocks includes a second conversion gain. The second conversion gains are larger than the first conversion gains, and the first pixel blocks include the pixel block located in the central location of the array.

In an embodiment of the invention, the pixel blocks include a first pixel block and a plurality of second pixel blocks. The first pixel block includes a first conversion gain. The second pixel blocks are located around the first pixel block. Each of the second pixel blocks includes a second conversion gain. The second conversion gains are larger than the first conversion gain. The first pixel block is the pixel block located in the central location of the array.

In an embodiment of the invention, the pixel blocks further include a plurality of third pixel blocks. The third pixel blocks are located around the second pixel blocks. Each of the third pixel blocks includes a third conversion gain. The third conversion gains are larger than the second conversion gain.

In an embodiment of the invention, the pixel blocks include a first pixel block, a plurality of second pixel blocks and a plurality of third pixel blocks. The first pixel block includes a first conversion gain. The second pixel blocks are located around the first pixel block. Each of the second pixel blocks includes a second conversion gain. The third pixel blocks are located around the first pixel block. Each of the third pixel blocks includes a third conversion gain. The third conversion gains are larger than the second conversion gain. The second conversion gains are larger than the first conversion gain. The first pixel block is the pixel block located in the central location of the array.

In an embodiment of the invention, the second pixel blocks and the third pixel blocks are alternately arranged in a first ring region of the array. The first ring region is around the first pixel block.

In an embodiment of the invention, the second pixel blocks are located in a horizontal direction and in a vertical direction of the array and beside the first pixel block.

In an embodiment of the invention, any two of the second pixel blocks are not neighboring in the horizontal direction and in the vertical direction of the array.

In an embodiment of the invention, the third pixel blocks are located in diagonal directions of the array and beside the first pixel block.

In an embodiment of the invention, any two of the third pixel blocks are not neighboring in a horizontal direction and in a vertical direction of the array.

In an embodiment of the invention, the pixel blocks further include a plurality of fourth pixel blocks and a plurality of fifth pixel blocks. The fourth pixel blocks are located in a second ring region of the array. Each of the fourth pixel blocks includes a fourth conversion gain. The fifth pixel blocks are located in the second ring region. Each of the fifth pixel blocks includes a fifth conversion gain. The fifth conversion gains are larger than the fourth conversion gain. The fourth conversion gains are larger than the third conversion gain. The second ring region is around the first ring region.

In an embodiment of the invention, the fourth pixel blocks are located in a horizontal direction and in a vertical direction of the array.

In an embodiment of the invention, at least two of the fourth pixel blocks are neighboring in the horizontal direction and in the vertical direction of the array.

In an embodiment of the invention, the fifth pixel blocks are located in diagonal directions of the array.

In an embodiment of the invention, any two of the fifth pixel blocks are not neighboring in a horizontal direction and in a vertical direction of the array.

In an embodiment of the invention, each of the pixel blocks includes a plurality of pixel circuits, and each of the pixel circuits includes the same conversion gain.

In an embodiment of the invention, each of the pixel circuits includes a photodiode and a transfer transistor. The photodiode includes a first end and a second end. The first end of the photodiode is coupled to a first voltage. The transfer transistor includes a first end, a second end and a control end. The first end of the transfer transistor is coupled to the second end of the photodiode. The second end of the transfer transistor is coupled to a floating node of the respective pixel circuit. The control end of the transfer transistor is coupled to a first control signal.

In an embodiment of the invention, the transfer transistor converts electrons generated from the photodiode into a sensing voltage at the floating node according to the conversion gain. The conversion gain is determined according to a capacitance value at the floating node.

In an embodiment of the invention, each of the pixel circuits further includes a reset transistor and a source follower. The reset transistor includes a first end, a second end and a control end. The first end of the reset transistor is coupled to a second voltage. The second end of the reset transistor is coupled to the floating node. The control end of the reset transistor is coupled to a second control signal. The source follower includes a first end, a second end and a control end. The first end of the source follower is coupled to a third voltage. The second end of the source follower is coupled to an output circuit via a sensing line. The control end of the reset transistor is coupled to the floating node.

In an embodiment of the invention, each of the pixel circuits further includes a row selecting transistor. The row selecting transistor includes a first end, a second end and a control end. The first end of the row selecting transistor is coupled to the second end of the source follower. The second end of the row selecting transistor is coupled to the sensing line. The control end of the row selecting transistor is coupled to a third control signal.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
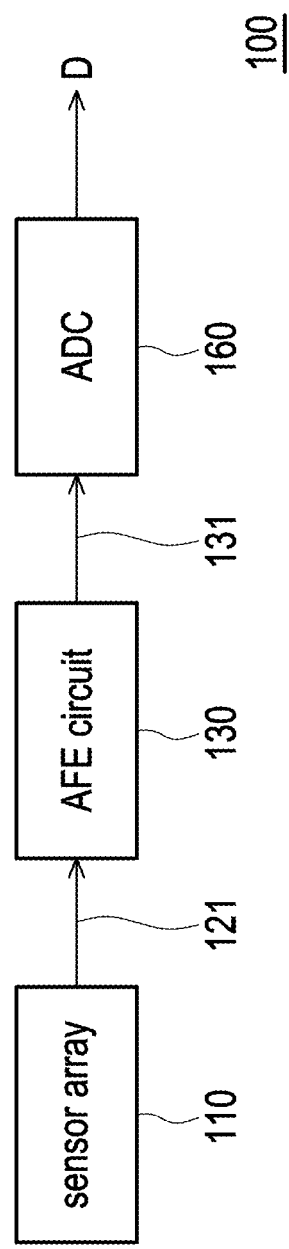
FIG. 1 is a schematic diagram of a fingerprint sensing device in accordance with an embodiment of the invention.

FIG. 1 is a schematic diagram of a fingerprint sensing device in accordance with an embodiment of the invention. Referring to FIG. 1, a fingerprint sensing device 100 includes a sensor array 110, an analog-front-end (AFE) circuit 130, and an analog-to-digital converter (ADC) 160. The sensor array 110 may include a plurality of pixels arranged in rows and columns, and the sensor array 110 is configured to sense the fingerprint of a user. For example, the sensor array 110 may be optical sensor array that captures an image of the user's fingerprint through the pixels of the sensor array 110 to generate a sensing signal.

The AFE circuit 130 is coupled to the sensor array 110, and is configured to generate an image signal 131 based on the sensing signal 121 outputted from the sensor array 110. The AFE circuit 130 may perform processing operations on the sensing signal 121 to generate the image signal 131. For example, the AFE circuit 130 may perform a sampling operation, an amplifying operation and/or a compensation operation on the sensing signal 121 to reduce noises and improve signal quality of the sensing signal 121. The AFE circuit 130 is configured to output the image signal 131 to the ADC 160. The disclosure does not intend to limit a circuit structure and operations of the AFE circuit 130.

An input terminal of the ADC 160 is coupled to the AFE circuit 130 to receive the image signal 131. The ADC 160 is configured to convert the image signal 131 which is an analog signal to a digital output code D. The digital output code D is a digital representation of the user's fingerprint being sensed through the sensor array 110. The digital output code D is outputted to a circuit next to the ADC 160 for fingerprint recognition.

Figure 2:
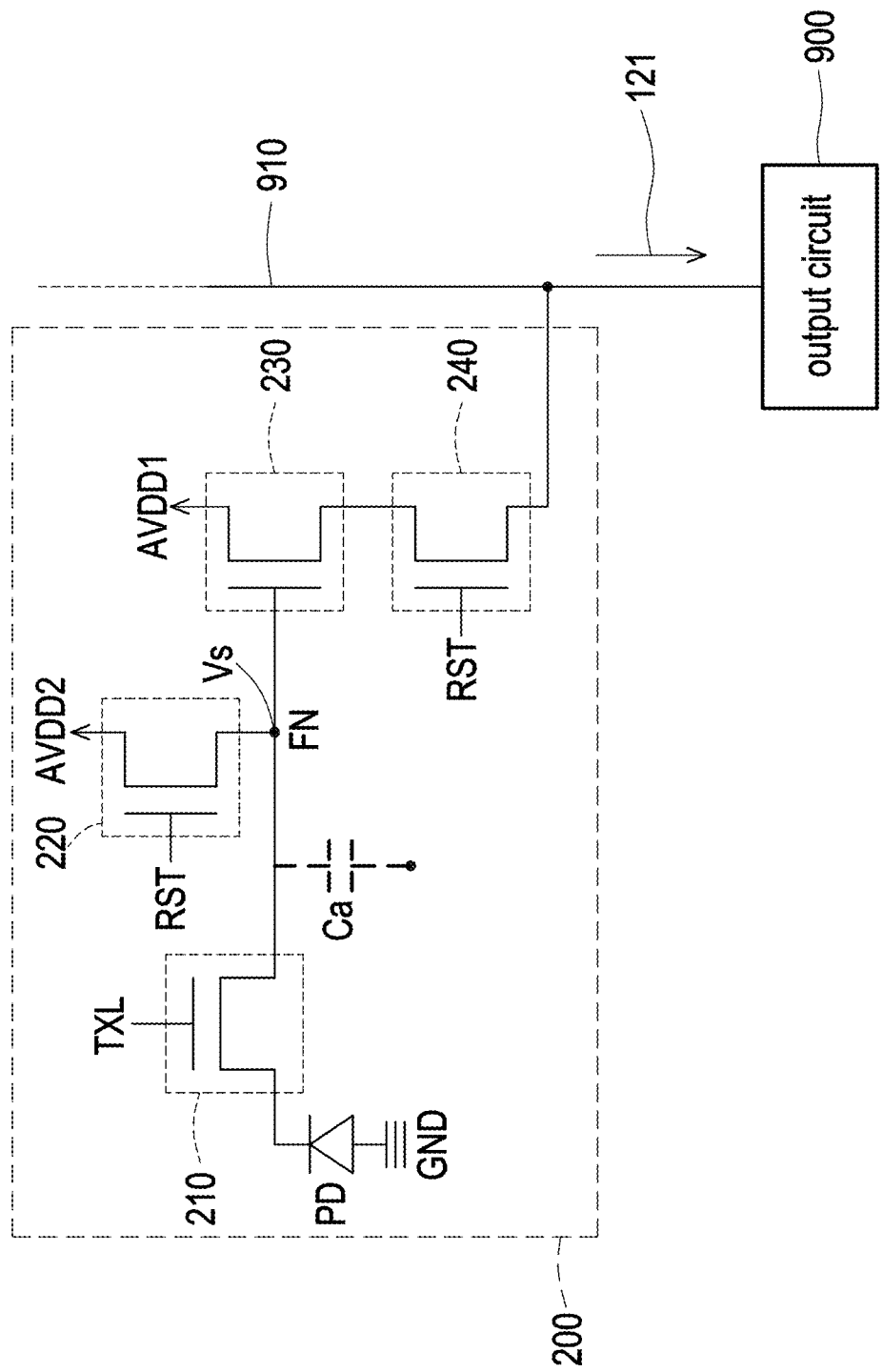
FIG. 2 is a schematic diagram of a pixel circuit in accordance with an embodiment of the invention.

FIG. 2 is a schematic diagram of a pixel circuit in accordance with an embodiment of the invention. Referring to FIG. 1 and FIG. 2, the sensor array 110 of FIG. 1 includes a plurality of pixels arranged in an array, and each of the pixels may have a circuit structure as illustrated in FIG. 2. The pixel circuit 200 incudes a photodiode PD, a transfer transistor 210, a reset transistor 220, a source follower 230, and a row selecting transistor 240. The circuit structure illustrated in FIG. 2 is taken for example, but does not intend to limit the invention.

To be specific, the photodiode PD includes a first end and a second end. The first end of the photodiode PD is coupled to a ground voltage GND (a first voltage). The second end of the photodiode PD is coupled to the transfer transistor 210. The transfer transistor includes a first end, a second end and a control end. The first end of the transfer transistor 210 is coupled to the second end of the photodiode PD. The second end of the transfer transistor 210 is coupled to a floating node FN of the respective pixel circuit 200. The control end of the transfer transistor 210 is coupled to a first control signal TXL. The first control signal TXL controls a conduction state of the transfer transistor 210. The transfer transistor 210 is turned on by the first control signal TXL for signal conversion during an exposure period.

The reset transistor 220 includes a first end, a second end and a control end. The first end of the reset transistor 220 is coupled to a second voltage AVDD2. The second end of the reset transistor 220 is coupled to the floating node FN. The control end of the reset transistor 220 is coupled to a second control signal RST. The second control signal RST controls a conduction state of the reset transistor 220. The reset transistor 220 is turned on by the second control signal RST to reset the floating node FN during a reset period. The source follower 230 includes a first end, a second end and a control end. The first end of the source follower 230 is coupled to a third voltage AVDD1. The second end of the source follower 230 is coupled to an output circuit 900 via a sensing line 910. The control end of the source follower 230 is coupled to the floating node FN.

The row selecting transistor 240 includes a first end, a second end and a control end. The first end of the row selecting transistor 240 is coupled to the second end of the source follower 230. The second end of the row selecting transistor 240 is coupled to the sensing line 910. The control end of the row selecting transistor 240 is coupled to a third control signal RSL. The third control signal RSL controls a conduction state of the row selecting transistor 240. The row selecting transistor 240 is turned on by the third control signal RSL during a readout period, and thus the sensing signal 121 is outputted from the pixel circuit 200 to the output circuit 900 via the sensing line 910. In an embodiment, the output circuit 900 may include the AFE circuit 130 and/or other circuits for signal processing.

In the present embodiment, the transfer transistor 210 converts electrons generated from the photodiode PD into a sensing voltage Vs at the floating node FN according to a conversion gain CG, and the conversion gain CG is determined according to a capacitance value Ca at the floating node FN. For example, the sensing voltage Vs is determined according to a formula: $Vs=Q/Ca$, where Q denotes the electron quantity generated from the photodiode PD, and Ca denotes the capacitance value at the floating node FN. The conversion gain CG is defined as $1/Ca$, i.e. a reciprocal of the capacitance value Ca, and thus determined according to the capacitance value Ca at the floating node FN.

In the present embodiment, the capacitance value Ca at the floating node FN may an equivalent capacitance value of a junction capacitor at the floating node FN, a total capacitor at the control end of the source follower 230, a capacitor between the control end and the second end of the reset transistor 220, and/or parasitic capacitance of the transistors 210, 220, 230, 240, the floating node FN, and metal routing of the voltages AVDD1, AVDD2. In addition, the capacitance value Ca at the floating node FN may also be adjusted by an additional metal-oxide-semiconductor (MOS) capacitor and/or additional metal routing.

Figure 3:
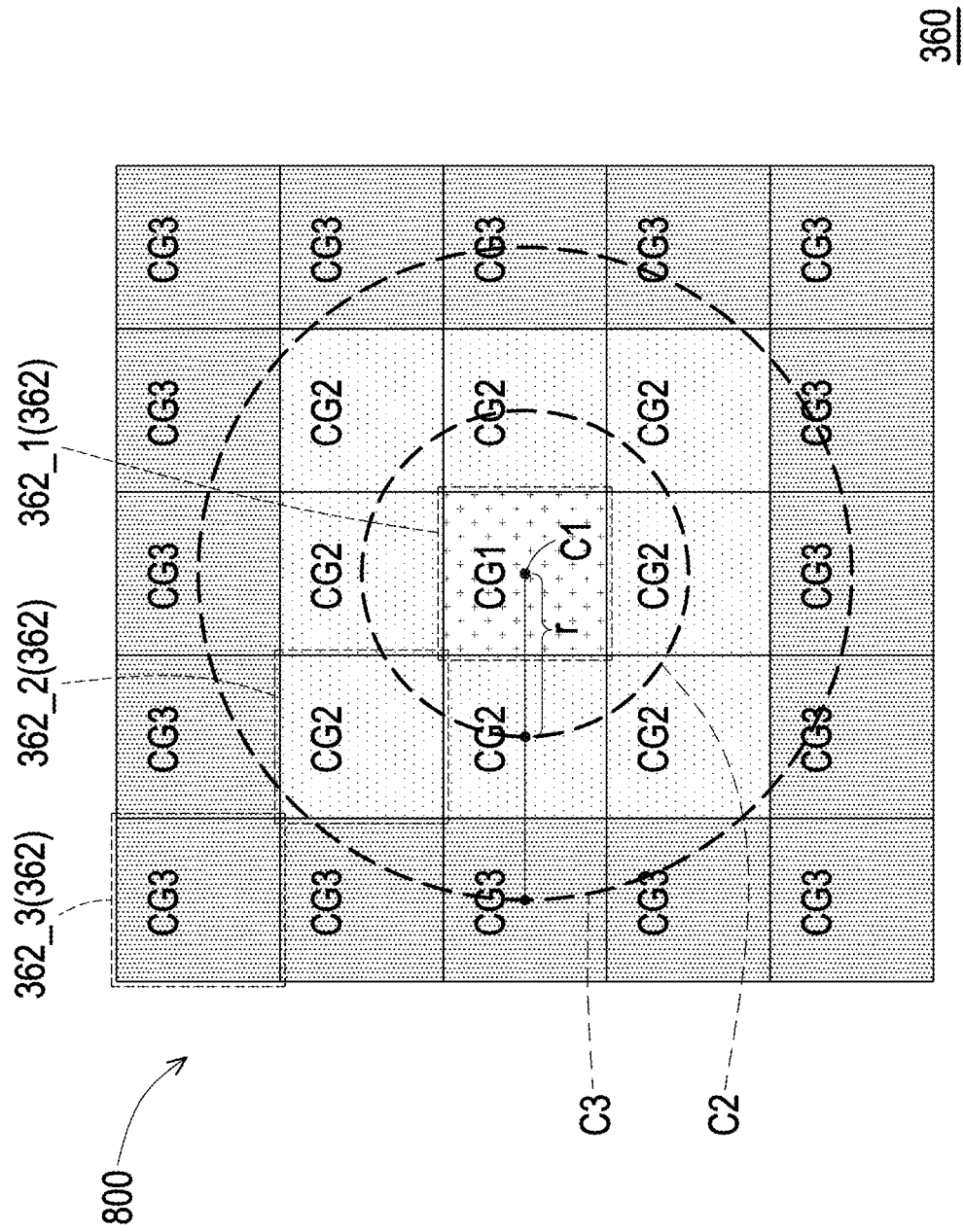
FIG. 3 is a schematic diagram of a sensor array in accordance with an embodiment of the invention.

FIG. 3 is a schematic diagram of a sensor array in accordance with an embodiment of the invention. Referring to FIG. 3, the sensor array 360 may include a plurality of pixel blocks 362. The pixel blocks 362 are arranged in an array 800. Each of the pixel blocks 362 includes a conversion gain. Each of the pixel blocks 362 includes the plurality of pixel circuits 200 as illustrated in FIG. 2, and each of the pixel circuits 200 located in the same pixel block includes the same conversion gain. The conversion gain that each of the pixel blocks 362 includes is marked in the corresponding block. In the present embodiment, the conversion gains CG1, CG2 and CG3 are different, and the pixel block 362_1 located in a central location of the array 800 has the minimum conversion gain CG1. That is to say, at least two of the conversion gains CG1, CG2 and CG3 are different.

To be specific, the pixel blocks 362 include the first pixel block 362_1, the plurality of second pixel blocks 362_2, and the plurality of third pixel blocks 362_3. The first pixel block 362_1 includes the first conversion gain CG1. The second pixel blocks 362_2 include the second conversion gains CG2. The third pixel blocks 362_3 include the third conversion gains CG3. The second pixel blocks 362_2 are located around the first pixel block 362_1. The third pixel blocks 362_3 are located around the second pixel blocks 362_2. From another aspect, the first pixel block and the second pixel blocks form a sub-array included in the array, and the third pixel blocks 362_3 are located around the sub-array.

As illustrated in FIG. 3, the distribution of the conversion gains CG1, CG2 and CG3 is designed based on a conception of concentric circles. A center C1 of circles C2 and C3 is a central location of the array 800. The first pixel block 362_1 located in a central location of the array 800 has the first conversion gain CG1. The second pixel blocks 362_2 located on the circle C2 include the second conversion gains CG2. The third pixel blocks 362_3 located on the circle C3 include the third conversion gains CG3. The third conversion gains CG3 are larger than the second conversion gains CG2, and the second conversion gains CG2 are larger than the first conversion gain CG1, i.e. CG3>CG2>CG1. That is to say, the first pixel block 362_1 located in a central location of the array 800 has the minimum conversion gain CG1.

Therefore, the distribution of the conversion gains may be designed according to a formula: $CG(r)=CG(center)+F(r)$, and $CG(r)>CG(center)$, where CG(r) is the conversion gain of the pixel block located in a specified location of the array, and CG(center) is the conversion gain of the pixel block located in a central location of the array and has the minimum conversion gain. In addition, F(r) is a variable changing along with a radius r, and the radius r is the distance between the central location and the specified location of the array.

Figure 4:
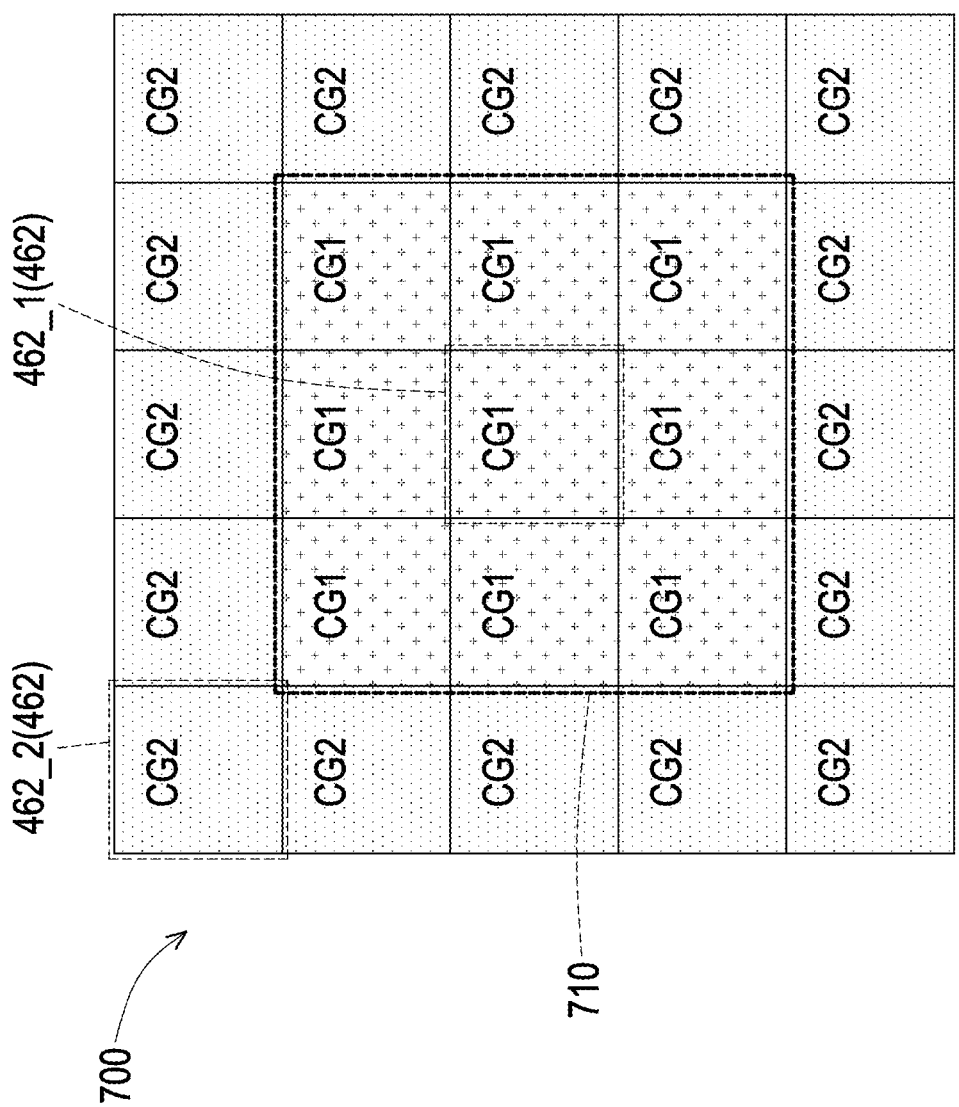
FIG. 4 is a schematic diagram of a sensor array in accordance with another embodiment of the invention.

FIG. 4 is a schematic diagram of a sensor array in accordance with another embodiment of the invention. Referring to FIG. 4, the sensor array 460 may include a plurality of pixel blocks 462. The pixel blocks 462 are arranged in an array 700. Each of the pixel blocks 462 includes a conversion gain. The conversion gain that each of the pixel blocks 462 includes is marked in the corresponding block. In the present embodiment, the conversion gains CG1 and CG2 are different, and the pixel block 462_1 located in a central location of the array 700 has the minimum conversion gain CG1. That is to say, the distribution of the conversion gains may be simplified as conversion gains of two steps.

To be specific, the pixel blocks 462 include the plurality of first pixel blocks 462_1 and the plurality of second pixel blocks 462_2. The first pixel blocks 462_1 form a sub-array 710 included in the array 700. The first pixel blocks 462_1 include the pixel block located in the central location of the array 700. The second pixel blocks 462_2 are located around the sub-array 710. The first pixel blocks 462_1 include the first conversion gains CG1, and the second pixel blocks 462_2 include the second conversion gains CG2. In the present embodiment, the second conversion gains CG2 are larger than the first conversion gains CG1, i.e. CG2>CG1.

Figure 5:
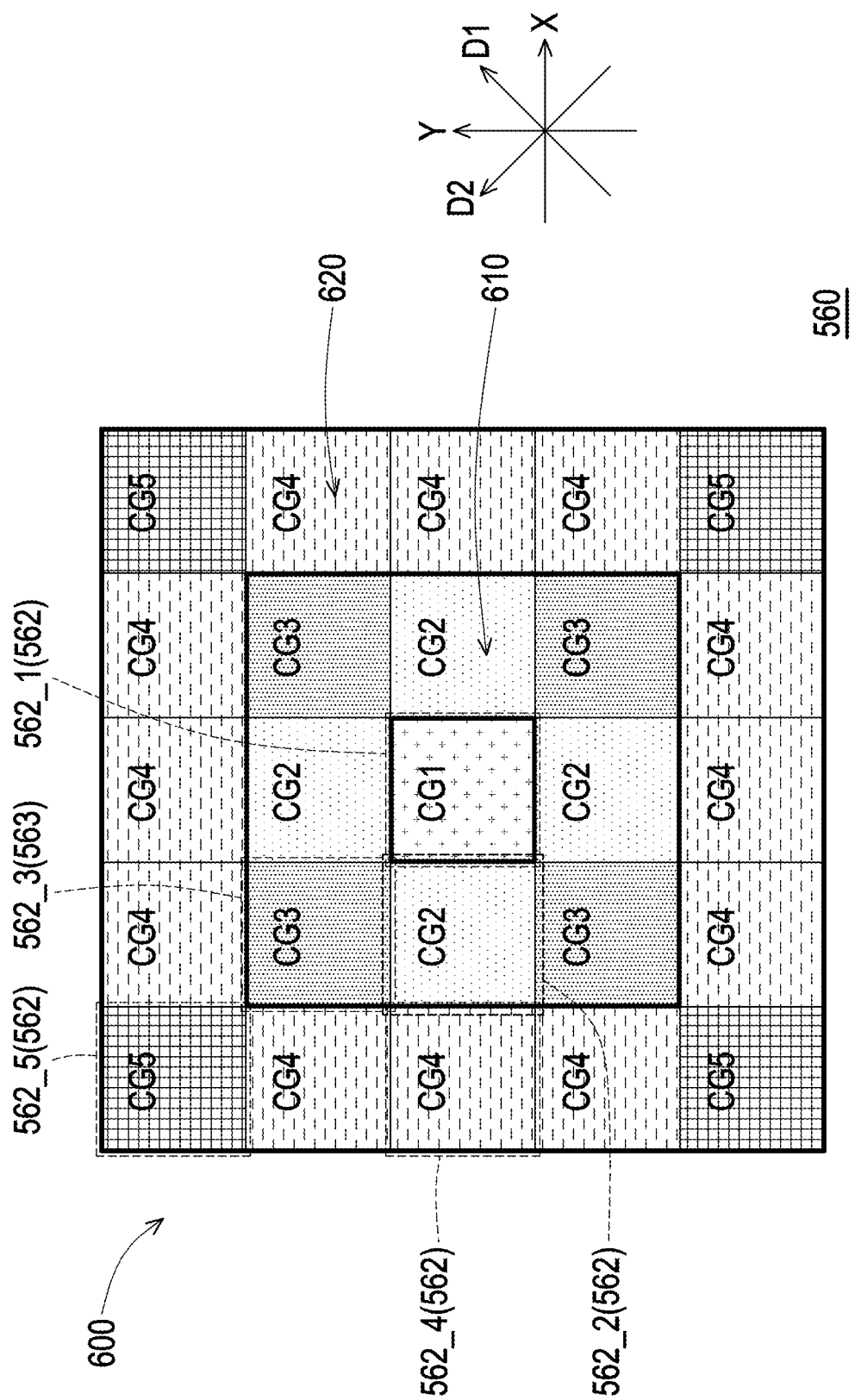
FIG. 5 is a schematic diagram of a sensor array in accordance with another embodiment of the invention.

FIG. 5 is a schematic diagram of a sensor array in accordance with another embodiment of the invention. Referring to FIG. 5, the sensor array 560 may include a plurality of pixel blocks 562. The pixel blocks 562 are arranged in an array 600. Each of the pixel blocks 562 includes a conversion gain. The conversion gain that each of the pixel blocks 562 includes is marked in the corresponding block. In the present embodiment, the conversion gains CG1, CG2, CG3, CG4 and CG5 are different, and the pixel block 562_1 located in a central location of the array 600 has the minimum conversion gain CG1. That is to say, at least two of the conversion gains CG1, CG2, CG3, CG4 and CG5 are different.

To be specific, the pixel blocks 562 include the first pixel block 562_1, the plurality of second pixel blocks 562_2, the plurality of third pixel blocks 562_3, the plurality of fourth pixel blocks 562_4, and the plurality of fifth pixel blocks 562_5. The first pixel block 562_1 located in a central location of the array 600 has the first conversion gain CG1. The second pixel blocks 562_2 include the second conversion gains CG2. The third pixel blocks 562_3 include the third conversion gains CG3. The fourth pixel blocks 562_4 include the fourth conversion gains CG4. The fifth pixel blocks 562_5 include the fifth conversion gains CG5. The fifth conversion gains CG5 are larger than the fourth conversion gain CG4, and the fourth conversion gains CG4 are larger than the third conversion gains CG3, i.e. CG5>CG4>CG3. The third conversion gains CG3 are larger than the second conversion gains CG2, and the second conversion gains CG2 are larger than the first conversion gain CG1, i.e. CG3>CG2>CG1. That is to say, the first pixel block 462_1 located in the central location of the array 600 has the minimum conversion gain CG1.

Referring to FIG. 5, the second pixel blocks 562_2 and the third pixel blocks 562_3 are located around the first pixel block 562_1. That is to say, the second pixel blocks 562_2 and the third pixel blocks 562_3 are alternately arranged in a first ring region 610 of the array 600, and the first ring region 610 is around the first pixel block 562_1. For example, the second pixel blocks 562_2 are located in a horizontal direction X and in a vertical direction Y of the array 600 and beside the first pixel block 562_1, and any two of the second pixel blocks 562_2 are not neighboring in the horizontal direction X and in the vertical direction Y of the array 600. In addition, the third pixel blocks 562_3 are located in diagonal directions D1 and D2 of the array 600 and beside the first pixel block 562_1, and any two of the third pixel blocks 562_3 are not neighboring in the horizontal direction X and in the vertical direction Y of the array 600.

On the other hand, the fourth pixel blocks 562_4 and the fifth pixel blocks 562_5 are located around the first ring region 610. That is to say, the fourth pixel blocks 562_4 and the fifth pixel blocks 562_5 are located in a second ring region 620 of the array 600, and the second ring region 620 is around the first ring region 610. For example, the fourth pixel blocks 562_4 are located in the horizontal direction X and in the vertical direction Y of the array 600, and at least two of the fourth pixel blocks 562_4 are neighboring in the horizontal direction X and in the vertical direction Y of the array 600. In addition, the fifth pixel blocks 562_5 are located in the diagonal directions D1 and D2 of the array 600, and any two of the fifth pixel blocks 562_5 are not neighboring in the horizontal direction X and in the vertical direction Y of the array 600.

Figures 6, 7:
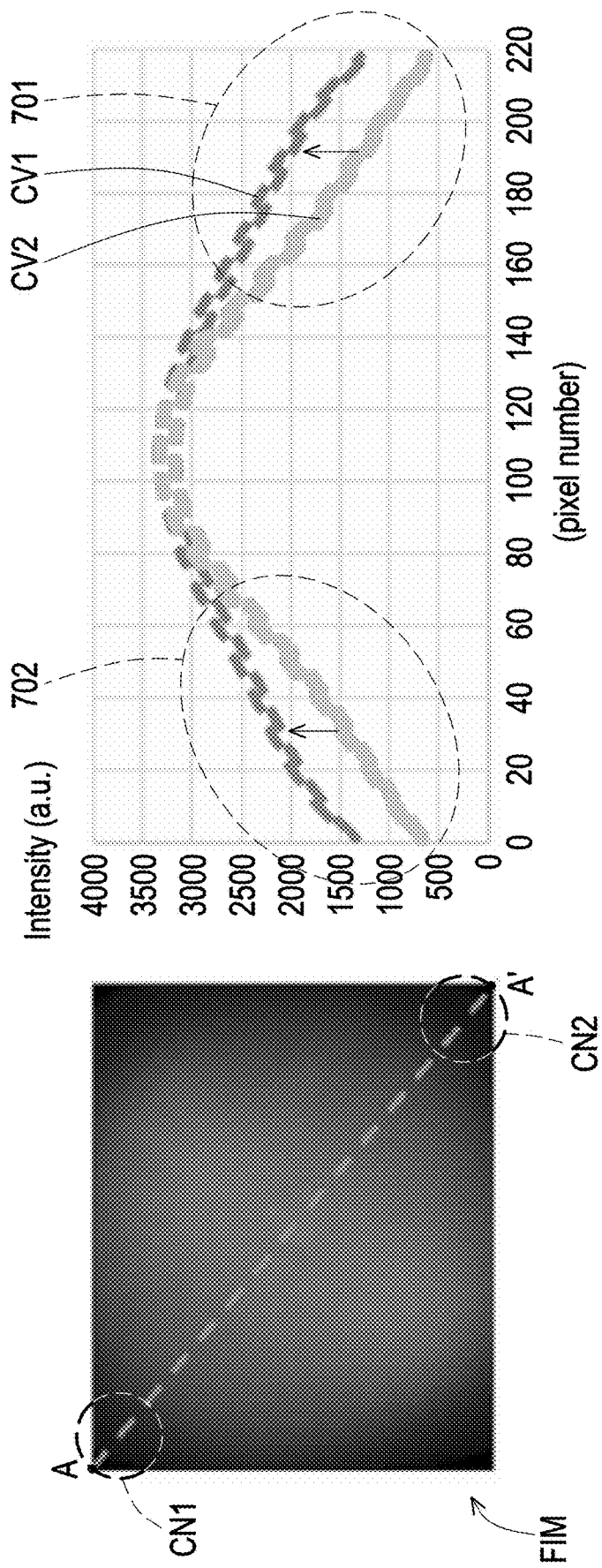
FIG. 6 is a schematic diagram of a fingerprint image in accordance with an embodiment of the invention.
FIG. 7 is a distribution diagram of signal intensity on line A-A' of FIG. 6.

FIG. 6 is a schematic diagram of a fingerprint image in accordance with an embodiment of the invention. FIG. 7 is a distribution diagram of signal intensity on line A-A' of FIG. 6. In FIG. 7, the horizontal axis shows the width of line A-A' of FIG. 6, and the vertical axis shows the signal intensity. Referring to FIG. 1, FIG. 6 and FIG. 7, the fingerprint image FIM of FIG. 6 is an image captured using an optical fingerprint sensor, e.g. the fingerprint sensing device 100 of FIG. 1, and the sensing signal 121 outputted from the sensor array 110 can be enhanced by gradient conversion gain design as exemplarily illustrated in FIG. 3 to FIG. 5.

For example, the curve CV1 is a signal intensity distribution curve of the sensing signal 121 and enhanced by gradient conversion gain design, and the curve CV2 is a distribution curve without being enhanced. After being enhanced by gradient conversion gain design, signal intensity of regions 701 and 702 is increased, and the center peak of the curve CV1 is still maintained. Therefore, image brightness at two dark corners CN1 and CN2 existing on line A-A' of the fingerprint image FIM can be enhanced, and image brightness at the center area of the fingerprint image FIM is unchanged.

In summary, in the embodiments of the invention, according to gradient conversion gain design, at least two of the conversion gains of the pixel blocks are different, and the pixel block located in a central location of the sensor array has a minimum conversion gain. The sensing signal outputted from the sensor array can be enhanced by gradient conversion gain design. After being enhanced, signal intensity of regions at dark corners of the fingerprint image can be increased, and signal intensity of the central portion of the fingerprint image is still maintained. Therefore, the fingerprint feature of the fingerprint image is nor blurred due to overexposure. The fingerprint image quality can be enhanced, and the accuracy of the fingerprint recognition is maintained.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fingerprint sensing device, comprising:
   a plurality of pixel blocks, arranged in an array, and each of the pixel blocks comprising a conversion gain, wherein at least two of the conversion gains are different, and the pixel block located in a central location of the array has a minimum conversion gain,
   wherein each of the pixel blocks comprises a plurality of pixel circuits, and each of the pixel circuits comprises the same conversion gain,
   each of the pixel circuits comprises a floating node, and the same conversion gain of each of the pixel circuits is determined according to a capacitance value at the floating node.

2. The fingerprint sensing device of claim 1, wherein the pixel blocks comprise:
   a plurality of first pixel blocks, forming a sub-array included in the array, and each of the first pixel blocks comprising a first conversion gain; and
   a plurality of second pixel blocks, located around the sub-array, and each of the second pixel blocks comprising a second conversion gain,
   wherein the second conversion gains are larger than the first conversion gains, and the first pixel blocks comprise the pixel block located in the central location of the array.

3. The fingerprint sensing device of claim 1, wherein the pixel blocks comprise:
   a first pixel block, comprising a first conversion gain; and
   a plurality of second pixel blocks, located around the first pixel block, and each of the second pixel blocks comprising a second conversion gain,
   wherein the second conversion gains are larger than the first conversion gain, and the first pixel block is the pixel block located in the central location of the array.

4. The fingerprint sensing device of claim 3, wherein the pixel blocks further comprise:
   a plurality of third pixel blocks, located around the second pixel blocks, and each of the third pixel blocks comprising a third conversion gain, wherein the third conversion gains are larger than the second conversion gain.

5. The fingerprint sensing device of claim 1, wherein the pixel blocks comprise:
a first pixel block, comprising a first conversion gain;
a plurality of second pixel blocks, located around the first pixel block, and each of the second pixel blocks comprising a second conversion gain; and
a plurality of third pixel blocks, located around the first pixel block, and each of the third pixel blocks comprising a third conversion gain,
wherein the third conversion gains are larger than the second conversion gain, the second conversion gains are larger than the first conversion gain, and the first pixel block is the pixel block located in the central location of the array.

6. The fingerprint sensing device of claim 5, wherein the second pixel blocks and the third pixel blocks are alternately arranged in a first ring region of the array, and the first ring region is around the first pixel block.

7. The fingerprint sensing device of claim 6, wherein the second pixel blocks are located in a horizontal direction and in a vertical direction of the array and beside the first pixel block.

8. The fingerprint sensing device of claim 7, wherein any two of the second pixel blocks are not neighboring in the horizontal direction and in the vertical direction of the array.

9. The fingerprint sensing device of claim 6, wherein the third pixel blocks are located in diagonal directions of the array and beside the first pixel block.

10. The fingerprint sensing device of claim 9, wherein any two of the third pixel blocks are not neighboring in a horizontal direction and in a vertical direction of the array.

11. The fingerprint sensing device of claim 6, wherein the pixel blocks further comprise:
a plurality of fourth pixel blocks, located in a second ring region of the array, and each of the fourth pixel blocks comprising a fourth conversion gain; and
a plurality of fifth pixel blocks, located in the second ring region, and each of the fifth pixel blocks comprising a fifth conversion gain,
wherein the fifth conversion gains are larger than the fourth conversion gain, the fourth conversion gains are larger than the third conversion gain, and the second ring region is around the first ring region.

12. The fingerprint sensing device of claim 11, wherein the fourth pixel blocks are located in a horizontal direction and in a vertical direction of the array.

13. The fingerprint sensing device of claim 12, wherein at least two of the fourth pixel blocks are neighboring in the horizontal direction and in the vertical direction of the array.

14. The fingerprint sensing device of claim 11, wherein the fifth pixel blocks are located in diagonal directions of the array.

15. The fingerprint sensing device of claim 14, wherein any two of the fifth pixel blocks are not neighboring in a horizontal direction and in a vertical direction of the array.

16. The fingerprint sensing device of claim 1, wherein each of the pixel circuits comprises:
a photodiode, comprising a first end and a second end, wherein the first end of the photodiode is coupled to a first voltage; and
a transfer transistor, comprising a first end, a second end and a control end, wherein the first end of the transfer transistor is coupled to the second end of the photodiode, the second end of the transfer transistor is coupled to the floating node of the respective pixel circuit, and the control end of the transfer transistor is coupled to a first control signal.

17. The fingerprint sensing device of claim 16, wherein the transfer transistor converts electrons generated from the photodiode into a sensing voltage at the floating node according to the conversion gain.

18. The fingerprint sensing device of claim 16, wherein each of the pixel circuits further comprises:
a reset transistor, comprising a first end, a second end and a control end, wherein the first end of the reset transistor is coupled to a second voltage, the second end of the reset transistor is coupled to the floating node, and the control end of the reset transistor is coupled to a second control signal; and
a source follower, comprising a first end, a second end and a control end, wherein the first end of the source follower is coupled to a third voltage, the second end of the source follower is coupled to an output circuit via a sensing line, and the control end of the source follower is coupled to the floating node.

19. The fingerprint sensing device of claim 18, wherein each of the pixel circuits further comprises:
a row selecting transistor, comprising a first end, a second end and a control end, wherein the first end of the row selecting transistor is coupled to the second end of the source follower, the second end of the row selecting transistor is coupled to the sensing line, and the control end of the row selecting transistor is coupled to a third control signal.

* * * * *